UNITED STATES PATENT OFFICE.

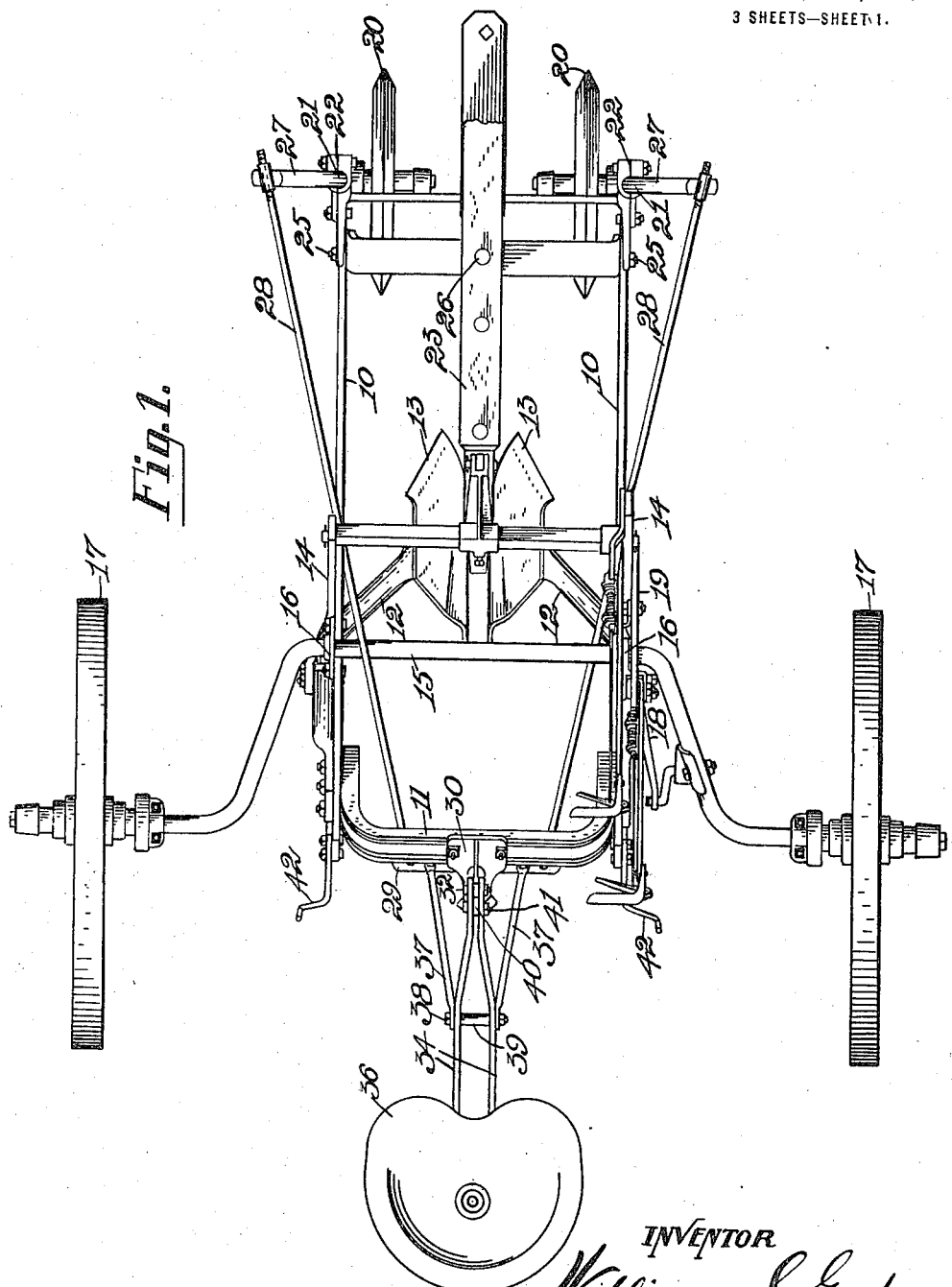

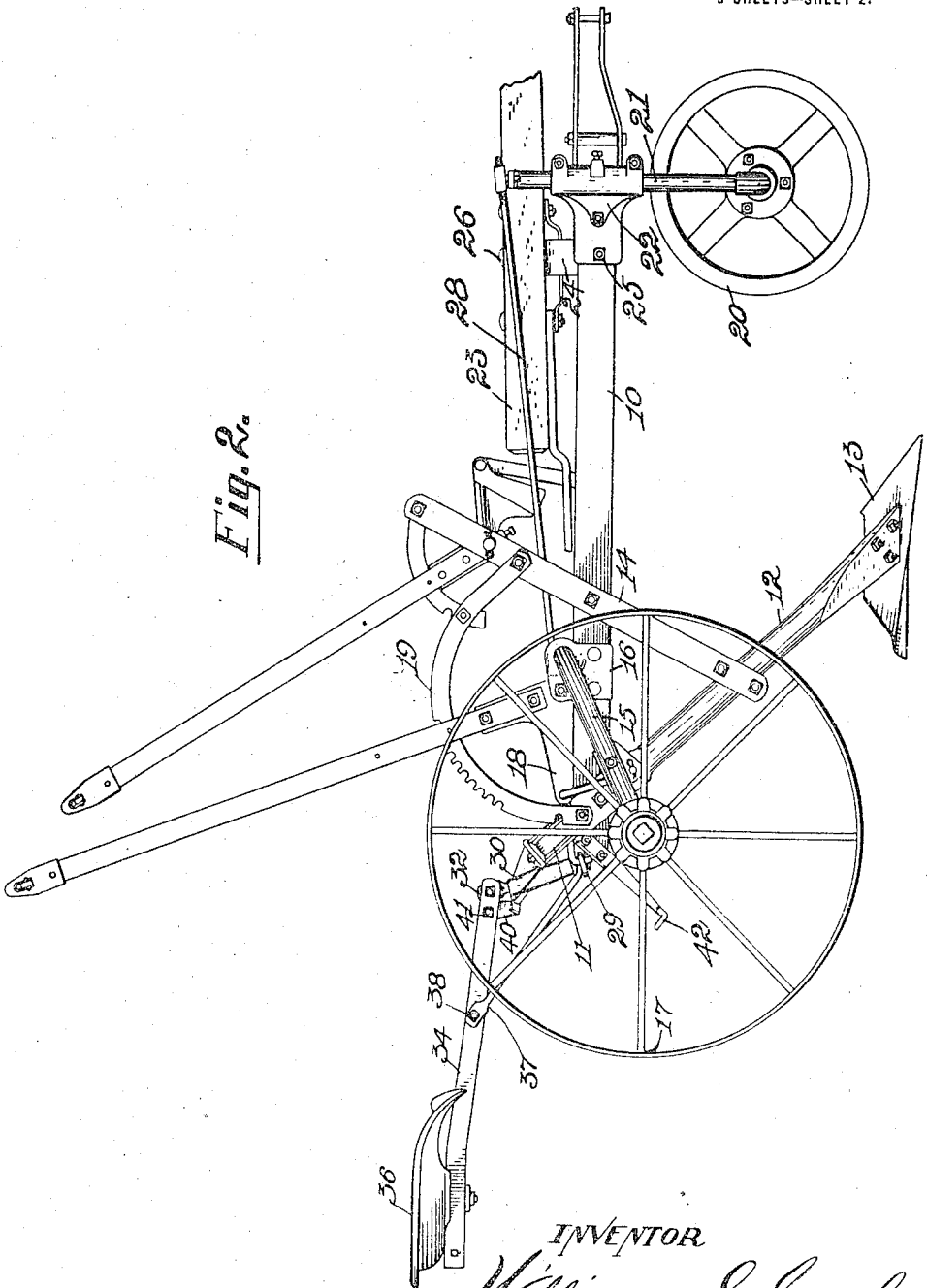

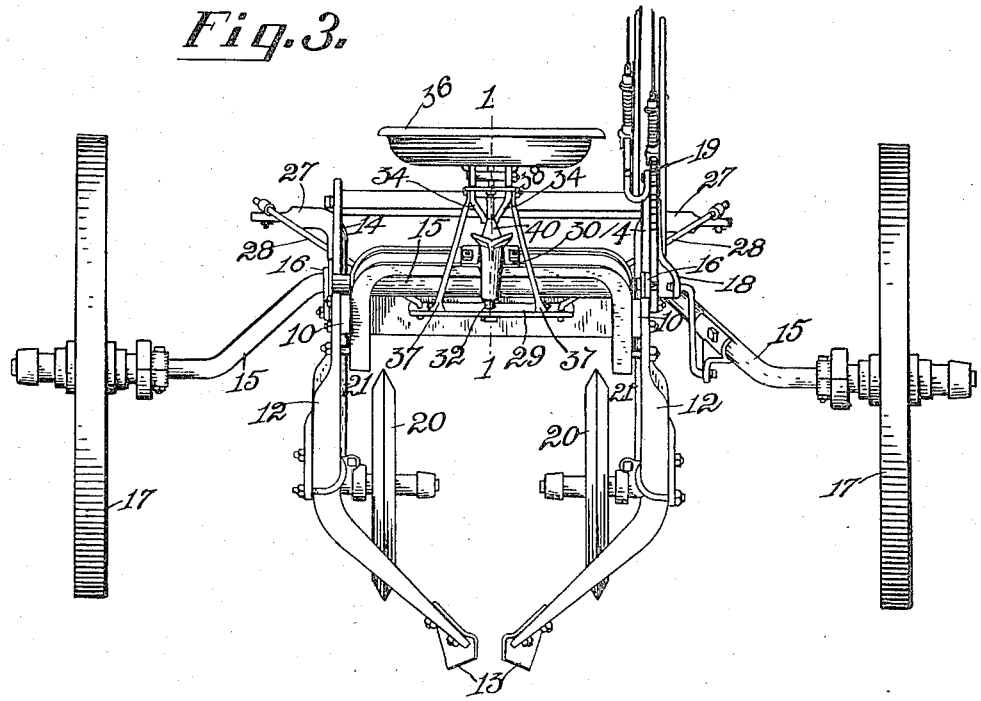
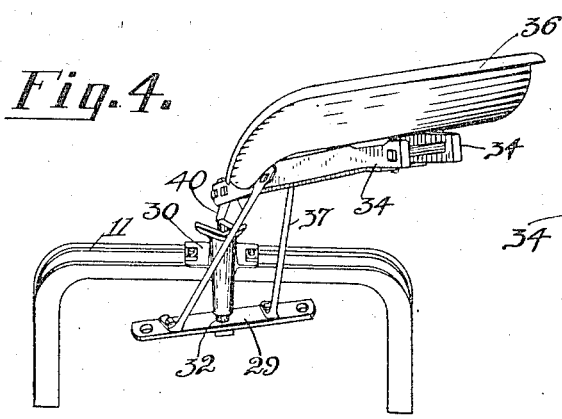
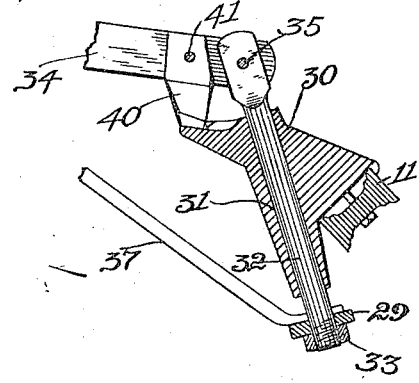

WILLIAM S. GRAHAM, OF CANTON, ILLINOIS, ASSIGNOR TO PARLIN & ORENDORFF COMPANY, OF CANTON, ILLINOIS, A CORPORATION OF ILLINOIS.

AGRICULTURAL IMPLEMENT.

1,290,174.   Specification of Letters Patent.   Patented Jan. 7, 1919.

Application filed March 1, 1918. Serial No. 219,761. Renewed November 18, 1918. Serial No. 263,097.

*To all whom it may concern:*

Be it known that I, WILLIAM S. GRAHAM, a citizen of the United States, and a resident of Canton, in the county of Fulton and State of Illinois, have invented certain new and useful Improvements in Agricultural Implements, of which the following is a specification, reference being had to the accompanying drawings.

This invention relates to improvements in agricultural implements and is illustrated in connection with a machine designed for pulling beets, such machine comprising a frame and two pairs of supporting wheels therefor, the forward pair of which is controlled for steering purposes by the lateral turning of the seat-support at the rear of the machine. In machines that traverse a field along rows of growing plants it is frequently necessary, owing to irregularities in the rows, for the machine to be swerved from side to side and consequently requires constant attention on the part of the operator. So turning from side to side makes it difficult many times for the operator to properly sight along a row or between two rows. If his seat is a pivoted one and connected with the guiding means, as is very frequently the case, he is liable to be carried so far to one side as to preclude proper observation by him of the plants ahead with respect to which the machine is about to perform its work.

My invention has for one of its objects the connecting of the seat to the frame in such manner that when turned toward either side of the machine the seat will have a tilting action which will so incline the driver that he can easily keep his eyes directed in the proper position to observe the work being done. Furthermore, by reason of such tilting action when the seat is turned laterally, the driver is enabled to exert his strength to better advantage for controlling the steering means when such means are connected with the seat frame, as they are in the machine shown. Briefly stated, I accomplish this object by connecting the seat-support to the frame by means of an inclined pivot pin.

It is another object of the invention to provide an improved means for normally holding the seat-frame in center position with respect to the main frame of the machine so as to a large extent to counteract the tendency of the guiding means (which in the construction here shown comprise a pair of caster-wheels) to divert the machine from a true course. By so holding the parts the driver is relieved to a large extent of the labor now imposed upon him in preventing such movements. Briefly stated, the invention in this particular comprises a bearing block carried by the pivoted seat-frame, which blocks rests upon a stationary member supported by the frame, one of such parts having inclined sides so that lateral swinging of the seat-frame is restrained with a consequent holding of the guiding means.

These objects I attain by the construction and arrangement of parts illustrated in the accompanying drawings and hereinafter particularly described. That which I believe to be new will be pointed out in the claims.

In the drawings:

Figure 1 is a plan view of a beet puller, showing my improvements applied thereto;

Fig. 2 is a side elevation of the machine,— the parts in both Figs. 1 and 2 being in the position they occupy when the machine is in operation;

Fig. 3 is a rear view of the machine;

Fig. 4 is a detail, being a rear view of the rear arch member of the main frame and the driver's seat and its connections to said arch member, the seat being shown turned to one side as it would be when the front wheels are angled, and Fig 5 is a vertical section taken at line 1—1 of Fig. 3.

Referring to the several figures of the drawings in which corresponding parts are indicated by like reference characters,—

10 indicates the side bars of the main frame which are connected at their rear ends, in the construction shown, by a heavy yoke or arch member 11. 12 indicates two diagonally arranged standards suitably connected at their upper ends to the supporting frame and preferably in alinement with the ends of the yoke or arch 11, such standards being rigidly secured to the side bars 10 and the arch 11 by bolts. Each standard carries at its lower end a lifting blade 13. 14 indicates brace bars, one for each standard 12, said brace bars being secured to the side bars 10. 15 indicates a wheel arch journaled in suitable brackets 16 secured to the side bars 10, upon the turned end portions of which arch are mounted a pair of rear carrying wheels 17. 18 indicates a bellcrank lever pivotally connected with one of the frame bars 10 and having such connection with the wheel arch 15 as to cause a swinging of such arch when the lever is moved to raise and lower the frame. 19 indicates a curved rack, along the side of which the lever 18 moves and with which such lever is adapted to engage, as usual. At the forward end of the main frame are located two supporting and guiding wheels, each indicated by 20. Each is journaled upon a horizontally-extending portion of a vertical axle 21, which vertical axles are journaled in brackets 22 secured, respectively, to the side bars 10. 23 indicates a tongue mounted for both lateral and vertical movement,—the vertical movement being provided for by reason of the tongue being secured to a yoke 24 that extends between the frame bars 10, the downwardly turned ends of the yoke being pivoted at 25 to such side bars 10, and the lateral movement of the tongue being provided for by reason of the tongue being connected to the yoke by means of a pivot bolt 26. Means are provided for raising the forward wheels 20 and the tongue 23 and locking the tongue in place, but as such features form no part of my present invention, I do not deem it necessary to here enter upon a detailed description of them. Such detailed description, however, is given in Letters Patent No. 1,261,227, dated April 2, 1918, granted upon an application filed by me.

The vertical axle members 21, which carry the caster wheels 20, are turned at their upper ends to form laterally extending arms 27, and to each of such arms is secured in any suitable manner a rod 28 that extends diagonally to the rear where it is fastened in any appropriate manner to one end of a pivoted cross-bar 29. Upon the turning of this pivoted cross-bar, it is evident that there will be exerted upon one of the rods 28 a pull, and a push upon the other, the result of which will be the turning of the pair of guiding wheels 20 to deflect the course of the machine as desired. 30 indicates a heavy bracket bolted to the central part of the rear arch member 11 of the main frame, and projecting rearwardly therefrom. As shown (see Fig. 5), it is provided with a diagonal passage 31 therethrough, in which revolubly fits a heavy pin 32, the inclination of the opening 31 being such that the upper end of the pin is considerably in rear of its lower end. As shown, this heavy pin 32 is somewhat longer than the passage 31 so as to allow a certain amount of longitudinal movement of the pin for a purpose hereinafter explained. The lower end of the rod is screw-threaded and receives a nut 33, which retains in place the cross-bar 29 before referred to, said cross-bar being centrally pivoted upon the pin 32. The upper end of the pin 32 is shown as being flattened so as to be adapted to lie between the forward ends of two seat bars 34 (see Fig. 1), it being connected to such seat bars by a bolt 35. The driver's seat, which is secured to the rear ends of these bars 34, is indicated by 36. 37 indicates two brace rods, each connected at its rear end to the outer face of one of the seat bars 34, and from thence extending forwardly and downwardly to near one end of the pivoted cross-bar 29 to which it is suitably connected. In the construction shown, a single bolt 38 connects the two rods 37 to the seat bars and also holds in place a spacing sleeve 39 interposed between and bracing apart the said seat bars. 40 indicates a block fixedly secured by a bolt 41 or otherwise between the said seat bars 34, a short distance in rear of the point of attachment of the heavy pin 32 of such seat bars. This block projects down below the seat bars, and its lower face is formed to provide two cam surfaces or inclines extending upward and laterally from its center, as clearly shown in Fig. 3, to adapt it to fit centrally and rest evenly upon the upper face of the bracket 30, which face, where it is in contact with the block 40, is formed so as to present two inclined surfaces, each rising from the longitudinal center of the block toward the side thereof, as clearly shown in said Fig. 3. In other words, the bracket at this point furnishes a shallow and slightly angular recess, in which rests the block 40 whose lower or bearing face is shaped to approximately correspond thereto. 42 indicates a pair of foot rests secured in any appropriate manner to the frame at opposite sides of the center thereof and projecting rearwardly.

When a machine of this character is in use, the unevenness of the ground over which the machine travels has a tendency to divert the machine from a true course, first to one side and then to the other, making it difficult and fatiguing for the operator who has to press his feet very hard against the foot supports 42 in order to counteract such motion. By providing the bracket 30 with the upwardly inclined walls on its upper face and providing the block 40 that extends down from the seat bars and rests on such surfaces, the strain on the operator is very much relieved for the reason that the frictional engagement of the inclined surfaces of these two parts is such that the front guiding wheels are quite strongly held against turning. When, however, a turn or deflection from the direct course is desired, the frictional resistance between the parts 30 and 40 is easily overcome by the driver transferring his weight in large part from the seat 36 to the foot rests 42, as will be understood. With the weight thus largely removed, the block 40 will be able to readily move up one or the other of the inclined surfaces of the bracket, according to the direction in which the turn or deflection from a straight course is made. It is to allow for the upward movement occasioned by the block 40 riding up one of said inclined faces that the cylindrical bearing portion of the pin 32, as shown in Fig. 5, is made somewhat longer than the opening 31 through which it passes.

As heretofore constructed, in machines of this general character wherein the forward wheels have been turned through the turning of the driver's seat, such seat has had its bars connected to a vertical pivot pin. While such a construction has been satisfactory so far as allowing a proper turning of the guiding wheels is concerned, it has been objectionable for the reason that frequently the driver's seat would have to be swung so far to one side as to carry the driver to a position where it was difficult for him to sight along the row that the machine was working upon. By arranging the pivot pin as herein shown,—that is inclined at a considerable angle and with its upper end farther back than its lower end—this objection is in a very large measure overcome, because with such a construction the rear ends of the seat bars cannot move to such a distance laterally, as where the pivot pin is vertical, but will have an upward movement as well as a lateral movement, which will, of course, tend to keep the driver's head in a position so that he can sight along the row. In operation, whenever it is desired to swerve from a direct line of travel, owing to an obstruction or an irregularity in planting, the driver will press with greater force upon one foot support 42 than on the other, and thus move the seat bars laterally, which, of course, through the rods 37 will cause the desired turning of the cross-bar 29, as usual, thus effecting a turning of the front wheels in the desired direction. In so doing, the driver's seat will not only be carried laterally, but by reason of the inclination of the pivot pin 32 will be given quite a decided forward tilting as indicated in Fig. 4, and such forward tilting will also have a tendency to incline the driver's body in such direction that he can, by turning his head, see along the row being operated upon,— being assisted also in this by the fact that his seat is not swung as far to one side as would be the case if a vertical pivot pin for the seat bars were employed. Furthermore, by reason of not being carried so far to one side he is more easily enabled to exert his weight against that foot rest 42 which he bears more heavily against in such turning operation. In the act of bringing the guiding wheels back to position to run in the straight forward direction, the block 40 will move easily down the inclined surface of the bracket 30, and upon reaching its central position, as in Fig. 3, it will, as stated, be of great assistance in preventing the usual sudden deflection of the guiding wheels from a straight course, as, of course, the weight of the driver on the seat bars will make it a matter of considerable difficulty to force the block 40 out of its central position and up one of the inclined surfaces on the upper face of the bracket.

What I claim as my invention, and desire to secure by Letters Patent, is,—

1. In an agricultural implement, the combination with a frame, of a seat connected with the frame and movable laterally thereof on an inclined axis.

2. In an agricultural implement, the combination of a frame, a seat, and means comprising an inclined pivot pin for connecting said seat and frame together.

3. In an agricultural implement, the combination of a frame, a seat in rear of the frame, and means for connecting said seat and frame together comprising a pivot pin inclined to position its upper end in rear of its lower end.

4. In an agricultural implement, the combination of a frame, a rearwardly-extending seat-bar, an inclined bearing mounted on the frame a pivot pin in said bearing and connected to said seat-bar, said pin being longitudinally-movable in the bearing, and a stationary inclined supporting means in rear of the said bearing upon which supporting means the said seat-bar movably bears.

5. In an agricultural implement, the combination of a frame, a rearwardly-extending seat-bar, an inclined bearing mounted on the frame, a pivot pin in said bearing and connected to said seat-bar, said pin being longitudinally-movable in the bearing, and a stationary supporting means in rear of said bearing upon which supporting means the said seat-bar movably bears, said supporting means having an inclined surface at each side of its center to cause resistance to lateral movements of the seat-bar.

6. In an agricultural implement, the combination with a wheeled frame, and guiding means connected therewith and laterally-movable with respect thereto, of a movable seat-support, means connecting said support and guiding means, and pivotal means connecting said support with the frame adapted to permit the support to be moved laterally and upwardly.

7. In an agricultural implement, the combination with a frame and dirigible wheels connected therewith, of a movable seat-support, means connecting said support and wheels, and pivotal means connecting said support with the frame adapted to permit the support to be moved laterally and upwardly.

8. In an agricultural implement, the combination with a frame and dirigible wheels connected therewith, of a movable seat-support, means connecting said support and wheels, and pivotal means connecting said support with the frame adapted to permit the support to be moved laterally, and simultaneously compelling an upward movement of the outer end of the support.

9. In an agricultural implement, the combination with a frame and dirigible wheels connected therewith, of a movable seat-support, means connecting said support and wheels, and pivotal means connecting said support with the frame adapted to permit the support to be moved laterally, and simultaneously compelling said support to assume a position inclined upward from the pivotal means.

10. In an agricultural implement, the combination with a frame and dirigible wheels connected therewith, of a movable seat-support, means connecting said support and wheels, and an inclined pivot pin journaled in a bearing on said frame and connected with said seat-support.

11. In an agricultural implement, the combination with a frame and dirigible wheels connected therewith, of a movable seat-support, means connecting said support and wheels, and a pivot pin journaled in a bearing on said frame and connected at its upper end to said seat-support, said pin being inclined to position its upper end in rear of its lower end.

12. In an agricultural implement, the combination with a frame and dirigible wheels connected therewith, of a seat-support, a pivot pin connecting the seat-support with the frame, said pivot pin being inclined from the vertical, a cross-bar pivoted on said pin, connections extending from said cross-bar to said wheels, and other connections extending from the cross-bar to the seat-support.

13. In an agricultural implement, the combination with a frame and dirigible wheels connected therewith, of a laterally-movable seat-support pivotally connected with the frame, means connecting said support and wheels so that the wheels will turn laterally upon the turning of said support, and means carried by the frame and seat-support, respectively, for frictionally engaging each other for opposing the tendency of the wheels to turn from a direct path.

14. In an agricultural implement, the combination with a frame and dirigible wheels connected therewith, of a laterally-movable seat-support pivotally connected with the frame, means connecting said support and wheels so that the wheels will turn laterally upon the turning of said support, a bearing block depending from the seat support, and a fixed member with which said block is in frictional engagement.

15. In an agricultural implement, the combination with a frame and dirigible wheels connected therewith, of a laterally-movable seat-support pivotally connected with the frame, means connecting said support and wheel so that the wheels will turn laterally upon the turning of said support, a bearing block depending from the seat-support, and a fixed member with which said block is in fractional engagement, said member having its engaging surface centrally depressed.

16. In an agricultural implement, the combination with a frame and dirigible wheels connected therewith, of a laterally-movable seat-support pivotally connected with the frame, means connecting said support and wheels so that the wheels will turn laterally upon the turning of said support, a block depending from the seat-support, and a fixed member with which said block is in frictional engagement, said member having portions inclined upwardly from the central portion of its engaging surface.

17. In an agricultural implement, the combination with a frame and dirigible wheels connected therewith, of a laterally-movable seat-support pivotally connected with the frame, means connecting said support and wheels so that the wheels will turn laterally upon the turning of said support, an inclined pivot pin journaled in a bearing on said frame and connected with said seat-support, and means carried by the frame and seat-support, respectively, for frictionally engaging each other for opposing the tendency of the wheels to turn from a direct path.

18. In an agricultural implement, the combination with a frame and dirigible wheels connected therewith, of a laterally-movable seat-support pivotally connected with the frame, means connecting said support and wheels so that the wheels will turn laterally upon the turning of said support, an inclined pivot pin journaled in a bearing on said frame and connected with said seat-support and movable longitudinally in said bearing, a block depending from the seat-support, and a fixed member with which said block is in frictional engagement, said member having portions inclined upwardly from the central portion of its engaging surface.

WILLIAM S. GRAHAM.

Copies of this patent may be obtained for five cents each, by addressing the "Commissioner of Patents, Washington, D. C."